R. A. LACHMANN.
BEARING FOR ROLLERS.
APPLICATION FILED MAY 10, 1915.

1,170,285.

Patented Feb. 1, 1916.
5 SHEETS—SHEET 1.

Fig. 1.

INVENTOR.
Robert A. Lachmann
By Barnett F. Truman
ATTORNEYS.

R. A. LACHMANN.
BEARING FOR ROLLERS.
APPLICATION FILED MAY 10, 1915.

1,170,285.

Patented Feb. 1, 1916.
5 SHEETS—SHEET 2.

INVENTOR.
Robert A Lachmann
BY Barnett L Truman
ATTORNEYS.

R. A. LACHMANN.
BEARING FOR ROLLERS.
APPLICATION FILED MAY 10, 1915.

1,170,285.

Patented Feb. 1, 1916.
5 SHEETS—SHEET 3.

INVENTOR.
Robert A. Lachmann
BY Barnett & Numan
ATTORNEYS.

UNITED STATES PATENT OFFICE.

ROBERT A. LACHMANN, OF CHICAGO, ILLINOIS, ASSIGNOR TO RAYMOND BROTHERS IMPACT PULVERIZER COMPANY, OF CHICAGO, ILLINOIS, A CORPORATION OF ILLINOIS.

BEARING FOR ROLLERS.

1,170,285.            Specification of Letters Patent.          Patented Feb. 1, 1916.

Application filed May 10, 1915. Serial No. 27,104.

*To all whom it may concern:*

Be it known that I, ROBERT A. LACHMANN, a citizen of the United States, residing at Chicago, in the county of Cook and State of Illinois, have invented certain new and useful Improvements in Bearings for Rollers, of which the following is a specification.

My invention relates to a roller for pulverizing mills, and the like, and means for providing a bearing for the same, the structure being of the same type as that shown in my co-pending application filed May 10, 1915, Serial No. 27,105.

The primary object of the present invention is to provide certain modifications of and improvements upon the structure shown in said co-pending application to be hereinafter described and claimed, which are advantageously employed under certain conditions, as will be hereinafter set forth.

The invention is illustrated, in certain preferred embodiments, in the accompanying drawings, in which—

Fig. 4, a detail sectional view taken on line 4—4 of Fig. 3; Fig. 5, a plan view of one of the rings composing the thrust bearing at the lower end of the shaft; Fig. 6, a fragmentary sectional view on line 6—6 of Fig. 5; Figs. 7 and 8, sectional views on lines 7—7 and 8—8 Fig. 1.

Like characters of reference designate like parts in the several figures of the drawings.

Figure 1:
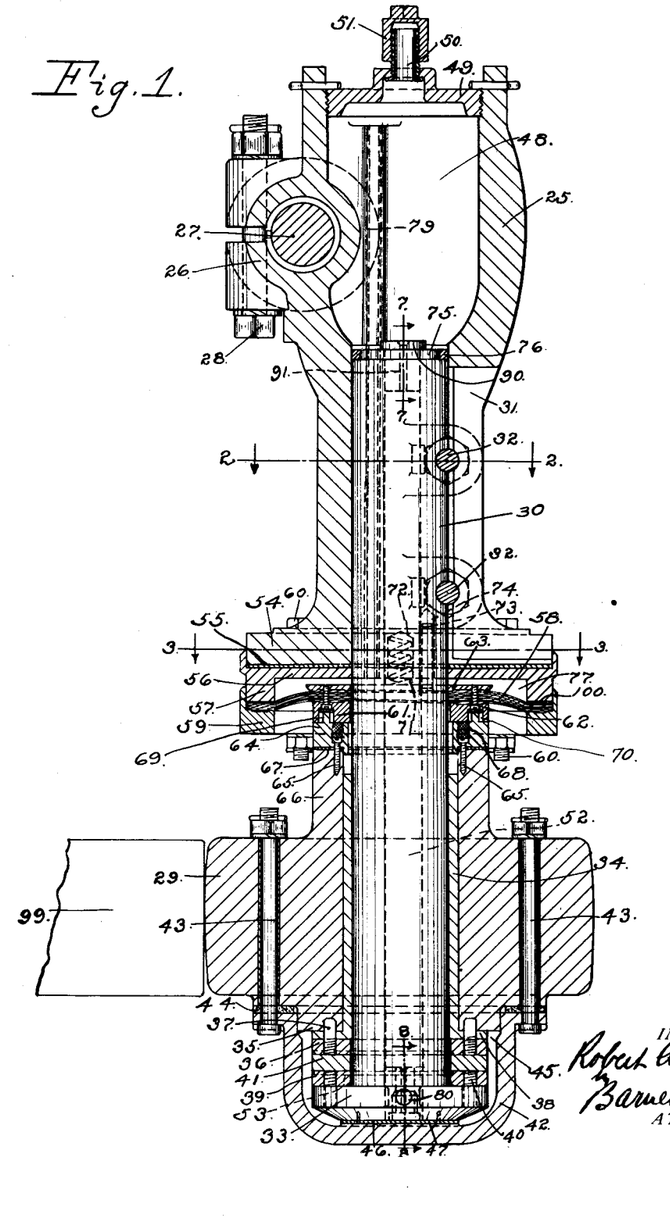
Figure 1 is a longitudinal sectional view of roller and its bearing illustrating one typical form of the invention, Figs. 2 and 3, sectional plans taken on lines 2—2 and 3—3 respectively, of Fig. 1.
Figure 2:
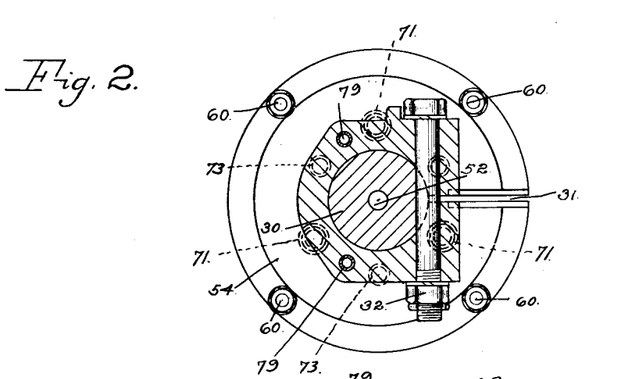

Referring first to the construction illustrated as a whole in Fig. 1 and fragmentarily in Figs. 2 to 13 inclusive, 25 designates a housing formed with a trunnion clamp 26 engaging a trunnion shaft 27 which is mounted with capacity for oscillation on a structure carried by the central revoluble shaft of the mill (not shown). The clamping action is brought about by bolts 28. The roller 29 is revolubly mounted on a shaft 30, the upper end of which is clamped in the lower part of the housing 25, the housing being formed with a longitudinal slot 31 and clamping effect produced by bolts 32. The lower end of the shaft is provided with a head 33, preferably formed integral with the rest of the shaft, which supports and takes the weight of the roller. Preferably a bushing 34 is arranged between the roller and the shaft and thrust rings interposed between the lower hub 35 of the roller and the head 33 I have shown three of these thrust rings, the upper ring 36 being provided with studs 37 which extend through the annular flange 38 on the bushing 34 and into holes in the hub 35 of the roller, thereby fastening both the ring and the bushing 34 to the roller, the lower ring 39 being secured by similar studs 40 to the head 33 while the intermediate ring 41 has a floating relation with the rest of the structure. I prefer to use three rings instead of two so as to obtain a greater amount of wearing surface. A cap 42 secured to the roller by bolts 43, with the interposition of a gasket 44, surrounds the end of the shaft and provides an inclosed lubricant space 45 around the thrust bearing provided by the rings 36, 39, 41. It will be understood that while the rings 36, 39, are made separate from the roller and the head of the shaft respectively, so that they may be replaced when worn, eliminating vertical play and thereby lengthening the life of the diaphragm, to be hereinafter described, structurally they form parts of these elements and might be made integral therewith.

The cap is preferably formed with an interior pad 46, and, if desired, one or more filler disks 47 may be interposed between the pad and the end of the shaft either when the structure is first built or when the parts have worn sufficiently to make this desirable.

Figures 3, 4, 5, 6, 7:
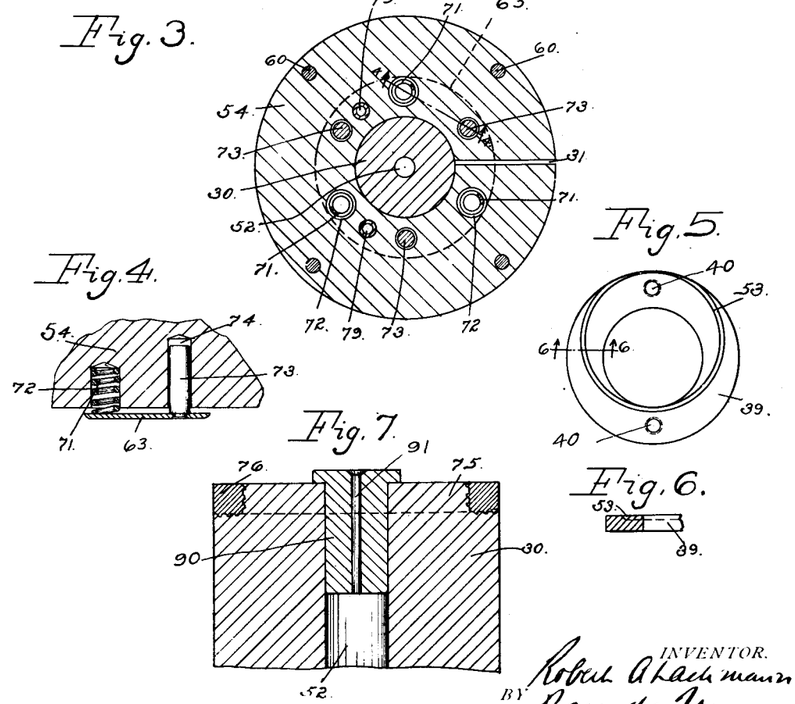

The space within the housing above the shaft 30 constitutes a lubricant chamber 48 which is closed at the top by a screw cap 49 provided with a nipple 50 for a cap 51. If an oil be used as a lubricant it may be poured into the chamber 48 through nipple 50. If a heavier lubricant, such as grease, is used it may be necessary to remove the cap 49 in filling the chamber. The shaft is formed with a lubricant duct 52 which extends through the shaft from end to end and serves to convey the lubricant from chamber 48 to the lubricant space around the thrust rings 36, 39, 41, whence the lubricant passes between the thrust rings and upwardly between shaft 30 and the bushing 34. This circulation of the lubricant is effected by gravity, centrifugal force and capillary attraction. If need be, in order to insure that a proper amount of lubricant move from the space 45 between the thrust rings, the latter, or some of them, may be formed with eccentric grooves 53 (Fig. 5).

Figure 11:
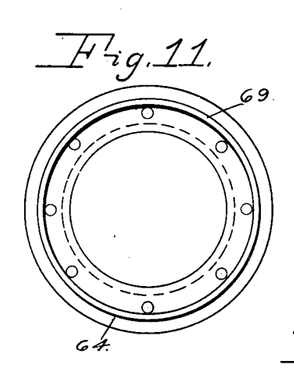
Fig. 11, a plan view of the lower one of the pair of rings forming part of the lubricant seal at the upper end of the roller.
Figure 12:
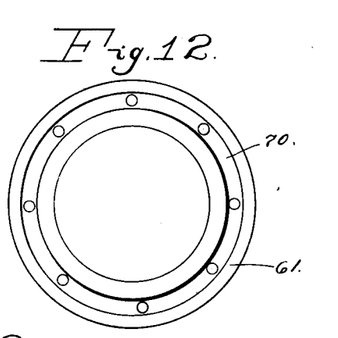
Fig. 12, a similar view of the under side of the upper one of said pair of rings.
Figure 13:
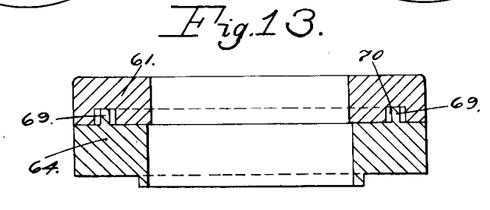
Fig. 13, a detail sectional view of these rings in their assembled position.

In order to provide a seal which will prevent the lubricant from being forced out of the bearing above the roller I provide certain sealing arrangements preferably constructed as follows: The housing terminates at the bottom in an annular flange 54 against the under side of which is arranged a sealing gasket 55 and against this a seal plate 56 formed with a downwardly extending flange 57. A flexible diaphragm 58, of any suitable material capable of withstanding constant vibration and contact with oil, hot or cold, is clamped against the flange 57 of the seal plate 56 by means of a ring 59 and bolts 60. A bearing ring 61, preferably of metal, is secured to the under side of diaphragm 58 by screw bolts 62 which extend through the ring, diaphragm and also through an annular clamping ring 63 on the upper side of the diaphragm. The ring 61 bears upon a ring 64 secured by screw bolts 65 to the upper hub 66 of the roller, a gasket 67 being preferably arranged between the ring and the hub of the roller. The holes in the rings 61, 64 below and above, respectively, the screw bolts 62, 65 are preferably filled with a filler 68 of suitable character, such as lead or babbitt. In order to check the outflow of the lubricant between rings 61, 64, one of these rings is preferably formed with a circular tongue 69 and the other with a circular groove 70, of greater width than the tongue, into which said tongue projects (Figs. 11, 12 and 13). Whether or not this expedient is used will depend somewhat upon the character of the lubricant employed and other conditions of like nature. The bearing rings are kept in contact one with the other by means of spiral springs 71 seated in cavities 72 in the flange 54 of the housing and bearing upon the upper clamping ring 63. The use of the flexible diaphragm 58 gives the seal capacity for accommodating itself to a lower position of the roller due to wear, also to possible rocking and vertical movements of the roller. To prevent torsional strain of the diaphragm, and possible cramping of the diaphragm and rings on the shaft, while permitting the necessary movement of the diaphragm vertically, the upper clamping ring 63 is preferably provided with studs 73 which enter socket openings 74 in the housing.

In order to prevent the lubricant in chamber 48 from running out between the housing and the shaft 30 the latter is formed on its upper end with a boss 75 of diminished diameter, and an annular seal 76 of lead, aluminum, or other suitable material, is driven in between the end of the shaft and the housing.

It will be seen that a lubricant space, designated 77, is provided between the diaphragm 58 and sealing plate 56. If the roller is capable of any vertical movement, and such will be likely to be the case after the parts of the bearing have worn down somewhat, these vertical movements or vibrations may produce pumping or pulsating movements in the lubricant in the space 77 and for that matter, throughout the bearing. If the pressures in the lubricant space 77 due to the pumping action be not relieved there may be danger of bursting the diaphragm. Furthermore, the compression of the lubricant within the space 77 may have a tendency to force too much of it out between the rings 61, 64, necessitating making the springs 71 very heavy which would be undesirable. To relieve the pressure in the lubricant space I have shown the housing provided with pipes 79 cast in the same and forming relief ducts which put the space 77 in communication with lubricant chamber 48 above the normal level of the lubricant in the latter.

Figure 8:
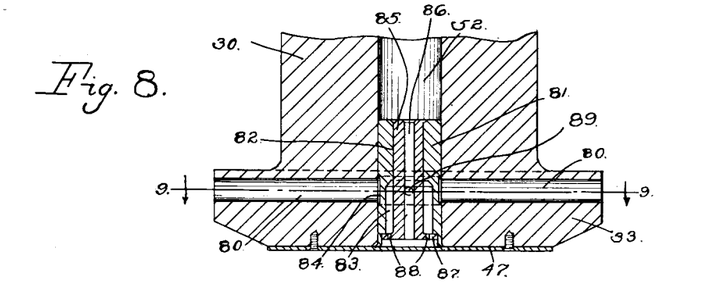
Figure 9:
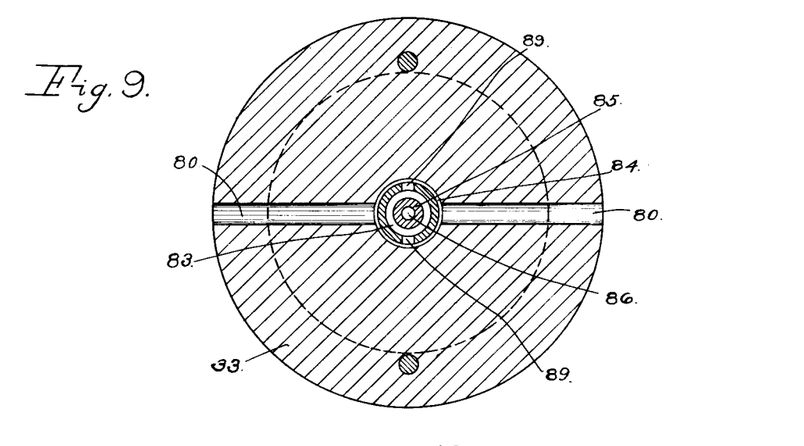
Fig. 9, a sectional plan taken on line 9—9 of Fig. 8.
Figure 10:
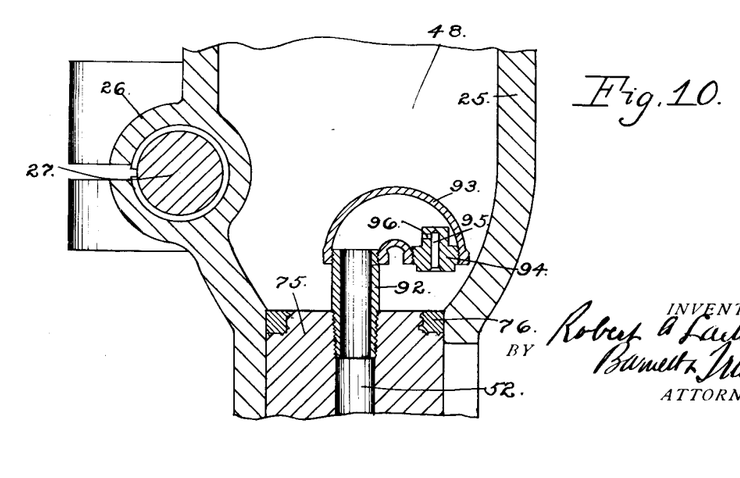
Fig. 10, a fragmentary sectional view illustrating one expedient for checking the pulsating or pumping movement of the lubricant through the apparatus.

In order to check the pulsating movements of the lubricant I may also provide the arrangements at the bottom of the structure which are detailed in Figs. 8 and 9. Broadly speaking, these arrangements provide a tortuous passageway between the lower end of duct 52 and the lubricant space 45 within the cap 42. The duct 52 extends to the bottom of the shaft and the head 33 of the shaft is drilled horizontally so as to provide cross ducts 80. A plug 81 is fixed in the lower end of the core 52. The plug is formed with a bore 82 and a larger counterbore 83, also with a circumferential groove 84 at the level of ducts 80. Within the plug 81 is a plug 85 fitted into the bore 82 and formed with a duct 86 and at its lower end with a shoulder 87 formed with ports 88. The outer plug 81 is formed with ports 89 leading from the space 83 to the groove 84 at points ninety degrees from ducts 80. This arrangement of a series of communicating ducts or passageways at angles to each other effectually checks any pulsating movements in the body of lubricant. A simple plug 90 formed with a small bore 91, which may be given the diameter necessary to insure a proper flow, may be fitted into the upper end of the duct 52 is shown in Figs. 1 and 7. In order, however, to check at this point the tendency of the lubricant to pulsate, the device shown in Fig. 10 may be employed in place of the plug just referred to. This device consists of a short pipe 92 fitted into the upper end of duct 52 and provided with a return bend elbow 93 in the end of which is fixed a plug 94 having a vertical bore 95 and a transverse bore 96. Any tendency of the lubricant to pulsate vertically will be checked by this arrangement before it can affect the lubricant in the duct 52.

It will be understood that any of the expedients above described for checking or minimizing the tendency of the body of lubricant in the bearing to pulsate may be used separately or all of these expedients may, if desired, be employed in a single structure. The roller 29, as is well understood in pulverizing mills of the type which my invention has particularly in view, operates against an annular member known as the bull ring, this member being fragmentarily shown in Fig. 1 and designated 99. The relief ducts 79 are purposely arranged on the side of the housing against the bull ring on the theory that the operation of the apparatus will tend to crowd the lubricant in the space 77 over to this side of the structure. In order to minimize wear on the diaphragm 58 a gasket 100 of some absorbent material may be interposed between the seal plate and the diaphragm. This gasket, by continually absorbing oil from the lubricant space 77, will keep the marginal portion of the diaphragm soft.

Operation: The chamber 48 is filled with a lubricant through nipple 50 or by removing the cap 49. It passes down through the duct 52 by gravity through the bore of plug 90 (Figs. 1 and 7) or through the shock absorbing device shown in Fig. 10. The lubricant used may be either oil or grease. The arrangement constituting my invention make it possible to use a relatively light lubricant instead of the heavy grease ordinarily employed for bearings of rollers of this type. Oil has greater lubricating value than grease. It is more easily handled since it may simply be poured into the oil chamber and for this reason can be kept freer from dust and grit. From the duct 52 the lubricant passes into the lubricant space 45 in cap 42 in part around the head 33 of the shaft, but in larger quantities through ducts 80 and the system of ducts in plugs 81, 85 which are arranged at angles to each other so as to effectively check any tendency of the lubricant to pulsate or to be pumped because of the inevitable vertical vibration of the roller and its associated parts. It is important to check such pumping of the lubricant, first, because of the deleterious effect it has on the lubricant itself, second, because the lubricant is thereby forced out of the bearing in too great quantities and wasted, and third, so as to relieve the diaphragm 58 from as much strain as possible. From the space 45 the lubricant passes inwardly between the thrust rings 36, 39, 41 and thence upwardly between the bushing 34 and shaft 30. The cap 42 effectively prevents the entrance of dust into the thrust bearing at the end of the shaft. The diaphragm 58, sealing plate 56, sealing gasket 55, bearing rings 61, 64, and gasket 67, prevent the escape of lubricant above the roller. The flexibility of the diaphragm permits the seal to accommodate itself to the wear of its parts and of the other parts of the roller bearing. The lubricant is carried upwardly along the shaft 30 by the pressure of the body lubricant in duct 52 and chamber 48 and by capillary attraction. The rings 61, 64 are kept together by the pressure of springs 71 which are made just strong enough to keep the rings in contact without exerting any unnecessary pressure. Enough of the lubricant will pass out between the rings to prevent the entrance of dust at this point. As a general rule it is essential that the entrance of dust between surfaces bearing one upon the other can only be prevented by an outward flow of lubricant. In order to prevent the lubricant from flowing out too freely between rings 61 and 64 these rings are preferably provided with a tongue and groove construction detailed in Figs. 11 to 13 inclusive, although this may not be essential except with a relatively light and fluid lubricant. The excess of lubricant forced up along the shaft 30 is collected, together with any grit and metal dust due to wear, in the lubricant space 77 between the seal plate 57 and diaphragm 58. The pumping pressure on this body of lubricant is relieved by relief ducts 79. The seal plate and clamping ring 59 are arranged so as to protect the diaphragm against injury by the material being pulverized.

Figure 14:
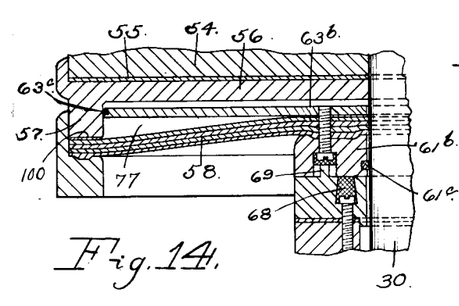
Fig. 14, a fragmentary vertical sectional view through one side of the sealing diaphragm and associated parts illustrating certain modified arrangements.

In Fig. 14 I have shown a modification, the primary object of which is to prevent the wasting of the lubricant in case the diaphragm 58 should become cracked, broken or perforated with use. In this modification the clamping ring 63$^b$ extends close to the flange 57 of the seal plate 56, and is provided with a gasket 63$^c$ of felt, leather, or other suitable material, which bears against the flange 57. In addition, if desired, the ring 61ᵇ is formed with a recess for a similar gasket 61ᶜ which bears against the shaft 30. The gaskets 61ᶜ, 63ᶜ, one or both of which may be employed, tend to check the flow of lubricant to the diaphragm 58, thereby preventing waste in case the diaphragm should become broken as above indicated.

Figure 15:
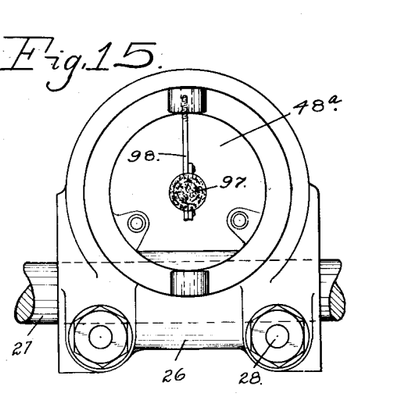
Fig. 15, a top plan view of another modified construction.
Figure 16:
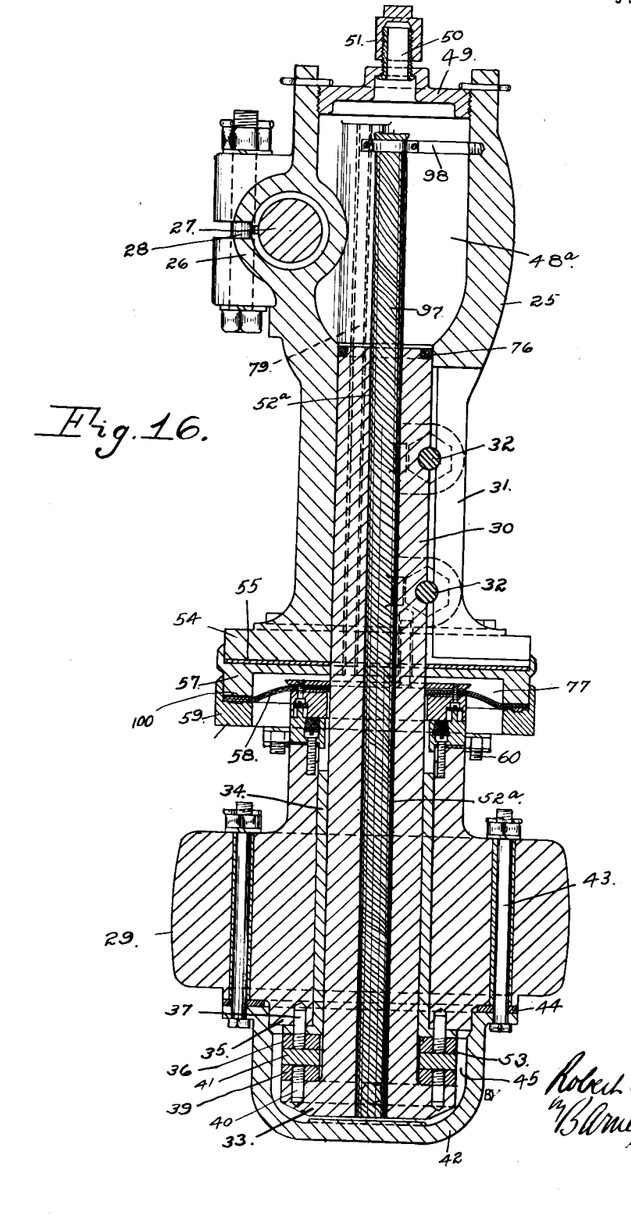
Fig. 16, a longitudinal sectional view of this modification.

In Figs. 15 and 16 I have shown another arrangement for checking the tendency of a light lubricant to pulsate. In this case a wick 97 is employed which extends through the duct 52ᵃ from end to end. The wick is made of any suitable absorbent material. It may be in the form of a rope, as shown, so that in addition to carrying the lubricant down to the point of delivery to the bearing by absorption and capillary attraction, the twisted structure of the wick will provide spiral channels through which the lubricant can flow by gravity in small quantities. Preferably the wick extends up through the lubricant chamber 48ᵃ and is held in place by a clip 98.

The structure shown herein has several features in common with those disclosed in my co-pending application Serial No. 27,105. These common features are not intended to be claimed in this application as they are claimed in the other application which is intended to cover generically the invention common to the two.

I claim:

1. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a flexible diaphragm, and seal rings bearing against each other one stationary and one secured to and rotating with the roller.

2. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, and sealing rings bearing against each other, one fixed to the diaphragm and the other secured to and ratating with the roller.

3. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, sealing rings bearing against each other, one fixed to the diaphragm and the other secured to and rotating with the roller, and springs which bear on the diaphragm so as to keep said rings in contact.

4. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, sealing rings bearing against each other, one fixed to the diaphragm and the other secured to and rotating with the roller, and guide studs for the diaphragm parallel with the axis of said shaft.

5. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, sealing rings bearing against each other, one fixed to the diaphragm and the other secured to and rotating with the roller, guide studs for the diaphragm parallel with the axis of said shaft, and springs which keep said rings in contact.

6. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a pair of sealing rings, and elastic means for keeping the same in contact.

7. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, and sealing rings bearing against each other, one fixed to the diaphragm and the other rotating with the roller, said rings being provided with means for checking the outflow of lubricant between the same.

8. The combination with a roller, of a shaft sustained in substantially vertical position providing a bearing for said roller and formed with a longitudinally extending lubricant duct arranged to supply lubricant to the bearing surfaces of the roller and shaft, sealing means surrounding the shaft above the roller to prevent the escape of lubricant comprising a non-rotating flexible diaphragm, and sealing rings bearing against each other, one fixed to the diaphragm and the other rotating with the roller, one of said rings being formed with a circumferential tongue and the other with a groove receiving said tongue for the purpose described.

9. The combination with a roller, of a shaft sustained in substantially vertical position on which the roller is revolubly mounted, and means at the lower end of the shaft providing a thrust bearing for the roller and a lubricant space surrounding the same, said structure being formed with a lubricant duct which leads to said lubricant space by tortuous passageways so that the pumping movement of the lubricant is checked.

10. The combination with a roller, of a shaft sustained in substantially vertical position on which said roller is mounted, the shaft having a head sustaining said roller, a cap on the roller surrounding the end of the shaft and providing a lubricant space, said shaft being formed with a main lubricant duct and said head being formed with a series of communicating ducts which put said main duct in communication with said lubricant space and which are arranged at angles to each other so as to check the tendency of the lubricant to pulsate.

11. The combination with a roller, of a shaft sustained in substantially vertical position on which said roller is mounted, the shaft having a head sustaining said roller, a cap on the roller surrounding the end of the shaft and providing a lubricant space, said shaft being formed with a main lubricant duct and the head with transverse ducts communicating with said lubricant space in the cap, a plug in the lower end of the main duct formed with a bore and a counter-bore in the lower end and with an exterior circumferential groove in line with the transverse ducts in the head, ducts at right angles to the ducts in said head leading from said counter-bore to said circumferential groove, and a plug fixed in said bore having a bore extending longitudinally therethrough.

12. The combination with a roller, of a vertically sustained shaft on which the roller is revolubly mounted provided with a lubricant duct arranged to supply a lubricant to the bearing surfaces of the roller and shaft, and means for checking the pulsating movement of the lubricant due to vibration of the structure.

13. The combination with a roller, of a vertically sustained shaft on which the roller is revolubly mounted provided with a lubricant duct arranged to supply a lubricant to the bearing surfaces of the roller and shaft, and means constituting inclosed lubricant spaces around the shaft above and below the roller, and means for checking the pulsating movement of the lubricant due to vibration of the structure.

14. The combination with a roller, of a vertically sustained shaft on which the roller is revolubly mounted, and means constituting a lubricant space around the shaft above said roller having a relief duct for the purpose described.

15. The combination with a roller, of a vertically sustained shaft on which the roller is revolubly mounted, means constituting a lubricant chamber above said shaft, and means constituting a lubricant space around the shaft above the roller, said structure being formed with a relief duct putting said lubricant space in communication with the lubricant chamber above the normal level of lubricant in the latter.

16. The combination with a roller, of a vertically sustained shaft on which the roller is revolubly mounted provided with a lubricant duct extending vertically therethrough arranged to supply lubricant to the bearing surfaces of the roller and shaft, and means at the bottom of said duct for preventing the pulsating movement of the lubricant due to vibration of the structure.

17. The combination with a roller, of a vertically sustained shaft on which said roller is mounted provided with a lubricant duct extending therethrough and arranged to supply lubricant to the bearing surfaces of the roller and shaft, means constituting a lubricant chamber above said shaft, and means at the upper end of said duct for checking the pulsating movement of the lubricant through the duct due to vibration of the structure.

18. The combination with a roller, of a vertically sustained shaft on which said roller is mounted provided with a lubricant duct extending therethrough and arranged to supply lubricant to the bearing surfaces of the roller and shaft, means constituting a lubricant chamber above said shaft, and means at the upper end of said duct for checking the pulsating movement of the lubricant through the duct due to vibration of the structure comprising a U-shaped tube fitted into the end of said duct and provided at its intake end with a plug having ducts therethrough at an angle to each other.

19. The combination with a substantially vertically sustained shaft, of a roller and means for supporting the roller on the lower end of said shaft, means constituting a lubricant chamber at the upper end of said shaft, said shaft being formed with a lubricant duct extending longitudinally therethrough, and means for preventing pulsating movements in the lubricant comprising a wick which extends through said lubricant duct.

20. The combination with a roller, of a vertically sustained shaft on which said roller is revolubly mounted provided with a lubricant duct, means constituting a lubricant chamber at the upper end of said shaft, and a wick extending through said duct and projecting into said chamber.

21. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a flexible diaphragm secured to the under side of said housing, and sealing rings one attached to said diaphragm and the other to said roller.

22. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a flexible diaphragm secured to the under side of said housing, sealing rings one attached to said diaphragm and the other to said roller, and springs adapted to keep said sealing rings in contact.

23. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a flexible diaphragm secured to the under side of said housing, sealing rings one attached to said diaphragm and the other to said roller, said housing being formed with bores, and guide studs on said diaphragm which are received in said bores.

24. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a flexible diaphragm secured to the under side of said housing, sealing rings one attached to said diaphragm and the other to said roller, said housing being formed with bores, guide studs on said diaphragm which are received in said bores, and springs mounted on the housing so as to bear upon said diaphragm.

25. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a seal plate secured to the under side of said housing and formed with a downwardly projecting flange, a flexible diaphragm secured to the flange of said seal plate, a ring fixed to the under side of said diaphragm, a ring secured to the roller on which said first mentioned ring bears, guide studs on the diaphragm which operate in said housing, and springs in the housing bearing upon said diaphragm.

26. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a seal plate secured to the under side of said housing and formed with a downwardly projecting flange, a flexible diaphragm secured to the flange of said seal plate, a ring fixed to the under side of said diaphragm, a ring secured to the roller on which said first mentioned ring bears, guide studs on the diaphragm which operate in said housing, and springs in the housing bearing upon said diaphragm, said diaphragm and seal plate constituting together a lubricant space and the housing being formed with a relief duct leading from said space to the space in the housing above said shaft.

27. The combination with a substantially vertically sustained housing, of a shaft fixed in the lower part of said housing, a roller revolubly mounted on the shaft, said shaft being formed with a lubricant duct arranged to supply lubricant to the bearing surfaces at the lower end of the shaft, a seal plate secured to the under side of said housing and formed with a downwardly projecting flange, a flexible diaphragm secured to the flange of said seal plate, a ring fixed to the under side of said diaphragm, a ring secured to the roller on which said first mentioned ring bears, guide studs on the diaphragm which operate in said housing, springs in the housing bearing upon said diaphragm, said shaft being formed with a head, thrust rings interposed between the head and the roller, and a cap attached to the roller and surrounding the lower end of the shaft.

28. The combination with a housing having a flange on its lower end, of a shaft fixed in said housing, a roller on the lower end of said shaft, formed with a lubricant duct arranged to supply lubricant to the bearing surfaces of the roller and shaft, and sealing means surrounding the shaft above said roller comprising a flexible diaphragm secured to said housing and bearing against the shaft, a sealing ring on the diaphragm coöperating with the upper end of the roller, and a plate secured to the upper side of the diaphragm and provided with a gasket which bears against the inner surface of the flange of the housing.

29. The combination with a housing having a flange on its lower end, of a shaft fixed in said housing, a roller on the lower end of said shaft, formed with a lubricant duct arranged to supply lubricant to the bearing surfaces of the roller and shaft, sealing means surrounding the shaft above said roller comprising a flexible diaphragm secured to said housing and bearing against the shaft, a sealing ring on the diaphragm coöperating with the upper end of the roller, a plate secured to the upper side of the diaphragm and provided with a gasket which bears against the inner surface of the flange of the housing, and a gasket interposed between said sealing ring and said shaft.

30. The combination with a roller, of a vertically sustained shaft on which the roller is mounted provided with a lubricant duct extending therethrough and arranged to supply lubricant to the bearing surface of the roller and shaft, means constituting a lubricant chamber above the shaft, and a substantially U-shaped inlet pipe arranged in the chamber, one end of which communicates with said lubricant duct in the shaft.

31. The combination with a roller, of a vertically sustained shaft having an enlarged head at the bottom sustaining said roller, said shaft being formed with a main lubricant duct extending longitudinally thereof and the head with a branch duct, and an element arranged at the bottom of said main lubricant duct providing a series of communicating passages through which the lubricant passes from the main duct to the branch duct.

ROBERT A. LACHMANN.

Witnesses:
L. A. FALKENBERG,
G. Y. SKINNER.